(12) United States Patent
Günter et al.

(10) Patent No.: US 6,412,392 B1
(45) Date of Patent: Jul. 2, 2002

(54) HYDRAULIC VALVE FOR A HYDRAULIC CONSUMER OF A VEHICLE

(75) Inventors: Ebinger Günter, Rheinmünster-Stollhofen; Homm Manfred, Bühl-Neusatz, both of (DE)

(73) Assignee: LuK Lamellen und Kupplungsbau GmbH, Behl/Baden (DE)

( * ) Notice: Subject to any disclaimer, the term of this patent is extended or adjusted under 35 U.S.C. 154(b) by 0 days.

(21) Appl. No.: 09/497,436

(22) Filed: Feb. 3, 2000

(30) Foreign Application Priority Data

Feb. 6, 1999 (DE) .......................... 199 04 882

(51) Int. Cl.[7] ............................................. F15B 13/042
(52) U.S. Cl. ................. 91/433; 137/625.66; 192/109 F
(58) Field of Search ...................... 91/433; 137/625.66; 192/109 F

(56) References Cited

U.S. PATENT DOCUMENTS 5,911,244 A * 6/1999 Long et al. ............... 91/433 X
5,924,539 A * 7/1999 Braun et al. ............. 192/109 F

FOREIGN PATENT DOCUMENTS

DE 197 21 036 1 A 11/1997

* cited by examiner

Primary Examiner—Gerald A. Michalsky
(74) Attorney, Agent, or Firm—Darby & Darby

(57) ABSTRACT

A hydraulic valve having a kinked characteristic curve is provided for a hydraulic consumer of a motor vehicle.

13 Claims, 5 Drawing Sheets

HYDRAULIC VALVE FOR A HYDRAULIC CONSUMER OF A VEHICLE

The present invention relates to a hydraulic valve having a kinked characteristic curve, more particularly, for a hydraulic consumer of a vehicle with a first and second valve body which are arranged axially displaceable in one bore and each have at least one control surface which can be biased by a control pressure fluid. The invention also relates to a motor vehicle having a hydraulic pressurized medium unit including a hydraulic consumer and at least one pressurised medium pump along with a hydraulic valve.

A hydraulic valve having a kinked characteristic curve for a hydraulic consumer of a vehicle is used for example when the hydraulic consumer has to meet performance demands which can be overall quite different. One such hydraulic consumer can be for example a multi-plate clutch operated by pressurised medium and having to cover in the vehicle a wide torque range since the vehicle in normal driving mode is operated as a rule with a low torque provided by the engine whilst the clutch however has to be capable of functioning even when there is a high torque arising on the engine side.

The hydraulic valve thereby serves to control the hydraulic consumer with a pressurised fluid as work fluid. During transfer of the engine torque to the drive train through a hydraulically operated clutch it is necessary therefore to meet two conditions, namely on the one side the maximum torque has to be transferred, which means that a certain maximum pressure has to be reliably produced, and on the other hand when starting off, whilst the clutch is slipped, the transferred torque has to be capable of the most precise possible finely measured adjustment so that the greatest possible comfort can be obtained.

The matter of comfort can be achieved with a relatively flat valve characteristic curve because, if disturbing factors arise, such as for example the appearance of hysteresis, changes in temperature which alter the viscosity of the preseurised fluid, dirt contamination or changes in friction, in the case of a flat valve characteristic curve only alight changes occur in the work pressure which are scarcely noticeable. However with such a flat valve characteristic curve the initial requirement of rapidly reaching a certain maximum pressure cannot be fulfilled.

A kinked valve characteristic curve can now be used to meet both requirements. This has a small rise in the case of low fluid flows and from a certain kink point has a large rise.

DE 197 21 036 A1 already discloses a hydraulic valve having a kinked characteristic curve and a vehicle having a pressurised medium unit with a hydraulic valve of this kind. Although the hydraulic valve known here has proved satisfactory, in practice it has as a result of its design with a seat valve the drawback that the seat valve has a constant through-flow after exceeding the kink point and thus a leak occurs and as a result of the complex flow conditions instability of the kink line can arise in the seat valve. It has also been seen that in the event of temperature changes the characteristic curve can undergo displacement and as a result of manufacturing tolerances it is necessary to adjust the valve during assembly.

The object of the present invention is therefore, in order to overcome the drawbacks described, to provide a hydraulic valve having a kinked characteristic curve which avoids the said adjustment expense during assembly and which is substantially insensitive to displacements of the characteristic curves. Furthermore a motor vehicle having a hydraulic pressurised medium unit and a hydraulic consumer is to be provided which can be supplied with a work fluid and has a predeterminable reliable operating behaviour.

The invention provides a hydraulic valve having a kinked characteristic curve for a hydraulic consumer of a motor vehicle, with a first and a second valve body which are each mounted axially displaceable in a bore and each have at least one control face which can be biased by a control pressure fluid wherein the one valve body is, provided with two pressure return faces which can be biased by a presourised fluid and which counteract the pressure biasing of the control surface, and wherein the other valve body controls the biasing of at least one of the pressure return faces.

Thus a hydraulic valve is provided having two pressure return faces which can be biased by a pressurised fluid, namely so that the biasing of the pressure return faces counteracts the biasing of the control face of the valve body wherein the biasing of one of the pressure return faces is controlled by the other of the two valve bodies. In the case of a relatively low control pressure the two pressure return faces are biased, whereupon a flat characteristic curve is produced which can change from a predetermined control pressure into a steeper characteristic curve from which at least one pressure return surface is biased with a constant or a decreasing return pressure.

According to a further development of the invention the two valve bodies are formed as a valve piston which in the region of the piston faces with the exception of slight leakage flows have no noticeable through-flows so that temperature-conditioned changes in the viscosity of the pressurised fluid do not lead to any displacements of the characteristic curve of the hydraulic valve.

The two pressure return faces on one of the valve pistons can be formed different size or however can also have the same sized active surface areas which can be biased by the pressurised fluid.

In a continuation of the invention it is proposed that at is least one of the two pressure return faces on the valve piston is biased by a pressurised fluid with variable pressure level. The pressurised fluid for biasing the at least one pressure return surface can be a work fluid supplied by a pump to the hydraulic valve under pressure for the hydraulic consumer so that through a connecting pipe the pump supplies the hydraulic valve with a volume flow of work fluid which is to be supplied to the hydraulic consumer through the hydraulic valve. Through a change in the cross-sectional area of an inlet supply of the hydraulic valve which takes place through an axial displacement of the valve piston in the bore of the hydraulic valve, work fluid is supplied to the hydraulic consumer which is also guided at the same time to a pressure return face of the valve piston, namely so that through the pressure of the returned work fluid to the pressure return face of the valve piston a force is produced which acts opposite a pilot or precontrol force which is produced by the control pressure fluid at the control surface of the valve piston.

At the same time the other pressure return face on the valve piston is biased with a pressurised force which acts opposite the force action through the control pressure biasing of the control surface of the valve piston, which from the proposed kink point of the valve characteristic curve is biased with a pressurised fluid of a substantially unchanged pressure level. This means that with the increase in the control pressure, biasing of the valve piston first the two pressure return faces on the valve piston are biased through for example the work fluid provided for the hydraulic consumer and that then the fluid supply to the second pressure return surface from the proposed kink point of the valve characteristic curve is interrupted or restricted through an axial displacement of the second valve piston so that from this time point the second pressure return surface is biased with a substantially unchanged, that is substantially stationary, pressure level, so that the force components stemming from the second pressure return surface and counteracting the force components produced by the control pressure biasing of the control surface is changed no more from the predetermined kink point of the valve characteristic curve. Further biasing of the control surface of the valve piston having the two pressure return surfaces through the control pressure fluid therefore leads to a further axial displacement of this valve piston in the bore of the hydraulic valve and thus to a rising volume flow of the work fluid supplied by the pressurised medium pump so that the pressure level of the work fluid supplied to the hydraulic consumer rises.

According to a further development of the invention it is possible that the other pressure return surface from the predetermined kink point of the valve characteristic curve is indeed furthermore biased with a pressurised fluid which has a changing pressure level, but this pressure level is however decreasing. To this end the valve piston which is used to control the biasing of the pressure return faces, can act as a regulating valve so that the volume flow supplied to the second pressure return face is reduced through the pressure regulating valve with rising pilot pressure at the valve piston of the regulating valve so that the force components which stem from the second pressure return face and which counteract the force components of the control pressure biasing of the valve piston having the two pressure return faces decreases to an increasing amount. Since at any considered moment the force component acting through the control pressure biasing of the control face on the valve piston having the two pressure return faces has to be balanced with the oppositely acting force components through the two pressure return faces, this design leads to a rise in the force component which is produced by the constantly biased pressure return surface.

A particularly space-saving design of the hydraulic valve can be produced if one of the valve pistons, preferably the valve piston having the two pressure return surfaces, has an internal bore in which the other valve piston is housed axially displaceable. The valve piston having the two pressure return surfaces which influences the supply of the hydraulic consumer with work pressure acts as a pressure regulating valve whilst the valve body controlling the biasing of the pressure return surfaces can act as a pressure reducing valve or as a pressure regulating valve or also as a route valve.

The control pressure fluid which biases the control surface of the valve piston having the two pressure return surfaces is a pilot pressure fluid supplied to the hydraulic valve through a for example independent pump. The control pressure fluid supplied to the corresponding control surface of the second valve piston can likewise be an independent pilot pressure fluid for example a pilot pressure fluid likewise supplied to the first valve piston having the pressure return faces, or in the case of the hydraulic valve designed with two interfitting displaceable valve pistons can be the work fluid supplied to the hydraulic consumer.

According to the invention a motor vehicle is also provided having a hydraulic pressurized medium unit, at least one hydraulic consumer and at least one pressurized medium pump wherein the motor vehicle has at least one hydraulic valve, such as already described above, which is provided for supplying the hydraulic consumer with a pressurized fluid as work fluid, wherein the pressure of the work fluid is substantially proportional to the control pressure of the control pressure fluid and from a predetermined control pressure ($P_{kink}$) the proportional ratio is increased relative to the region below the predetermined control pressure. This means that a work fluid is supplied to the hydraulic consumer of the motor vehicle through the hydraulic valve so that in the first operating range the pressure of the work fluid runs substantially proportional to the pressure of the control pressure fluid whilst the proportional ratio between the pressure of the work fluid and the pressure of the control pressure fluid is increased. In the first region therefore a change in the control pressure leads to a comparatively slight change in the pressure of the work fluid which is supplied to the hydraulic consumer so that the pressure of the work fluid in this first region can be changed with fine sensitivity through a change in the control pressure and a change in the control pressure after a change in the proportional ratio leads to a clearly marked change in the pressure of the work fluid. A change in the input characteristic value control pressure therefore results in the first region only in a slight change in the starting characteristic value pressure of the work fluid, whilst after the change in the proportional ratio a change in the input characteristic value control pressure leads to a clearly more marked change in the output characteristic value pressure of the work fluid.

It is thereby possible that the proportional ratio changes substantially suddenly but it can also be changed continuously.

The hydraulic consumer of the motor vehicle can thereby have a wet-running multi-plate clutch and/or a hydrodynamic converter which can also have a converter lock-up clutch, and/or a transmission wherein according to a preferred embodiment the transmission is a continuously variable transmission which has two pairs of cone pulleys whose piston/cylinder units are biased with the work fluid. Biasing the piston/cylinder units with the work fluid supplied through the hydraulic valve can thereby be both dependent on transmission and dependent on the torque which is to be transferred from the continuously variable transmission to the drive train of the motor vehicle.

The invention will now be explained in further detail with reference to the drawings in which.

Figure 1:
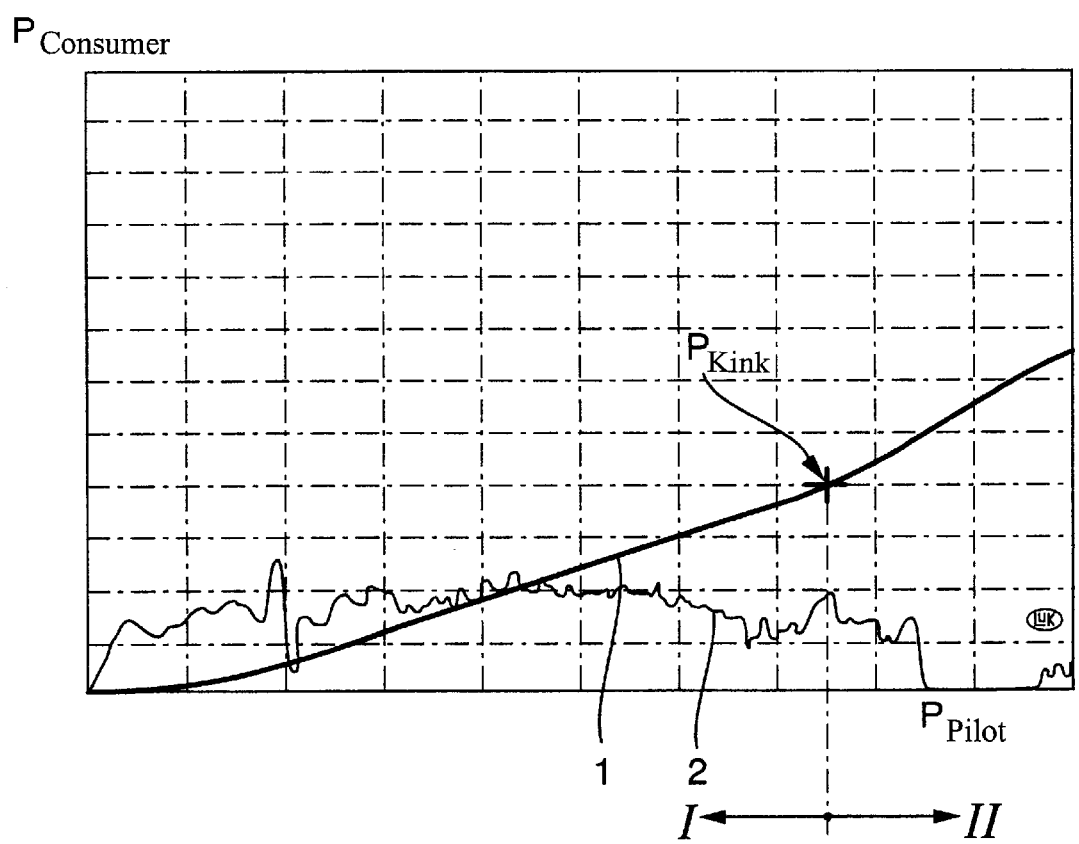
FIG. 1 shows a diagrammatic view of a characteristic curve of the hydraulic valve.

FIG. 1 of the drawing shows for explanation a kinked characteristic curve of a consumer pressure recorded over a pilot pressure. By the term consumer pressure in hereby understood the pressure of a work fluid which is supplied to a hydraulic consumer, for example a wet-running multi plate clutch of a motor vehicle. The pilot pressure is thereby the pressure of the control fluid with which control faces of the hydraulic valve are loaded in order to exert a control function in dependence on which the consumer pressure is to be changed.

As can be readily seen from FIG. 1, the consumer pressure $P_{consumer}$ shows a basically linearly rising behavior which can be seen from the substantially straight line curve 1 of FIG. 1. The curve 1 thereby has a substantially constant rise in the first region up to a pilot pressure $P_{kink}$. It should be mentioned by way of explanation that the curve 1 is made up of two curve lines which have a slight distance from each other seen in the direction of the vertical axis since FIG. 1 shows a full cycle with a sight hysteresis between the top and bottom curve line. The second curve 2 shown in FIG. 1 has a hysteresis path which is however not significant for the present application. The curve 1 according to FIG. 1 thus shows with increasing pilot pressure $P_{pilot}$, thus the pressure with which the control fluid loads the control surface of the hydraulic value, a substantially linear path from which a first proportionality factor can be derived. As a result of the rise of the curve below the kink point, which is designated in FIG. 1 with the pressure at the kink point $P_{kink}$, which is clearly smaller than the rise of the curve 1 to the right of the kink point, in this first region a change in the pilot pressure only leads to a slight change in the consumer pressure. After exceeding the pilot pressure $P_{kink}$ at the kink point the curve 1 shows a greater rise so that the proportionality factor between the pilot pressure and the consumer pressure increases substantially suddenly from the kink point. In this second region II a change in the pilot pressure leads to a clearly greater change in the consumer pressure than is the case in the region I, thus in the region below the pressure $P_{kink}$.

A characteristic curve of this kind shown in FIG. 1 can be advantageous for example in the case of a wet-running multi-plate clutch, a converter lock-up clutch or in the case of a control element of a cone pulley set of a continuously variable cone pulley belt contact gearbox. It is also possible that the hydraulic consumer is a start-up clutch or a turning set clutch of an automatic transmission, thus for example of a continuously variable cone pulley belt contact gearbox or even of a stepped, transmission.

The region I described above is characterised by a fine sensitive change in the consumer pressure in dependence on the pilot pressure so that in this region in a hydraulic system any undesired changes in the pilot pressure which may appear as a result of temperature changes, dirt contamination and the like do not have a marked effect on the consumer pressure. If the hydraulic consumer is a multi-plate clutch then a change in the pilot pressure for example during the starting up process of the vehicle fitted with the multi-plate clutch does not lead to any loss of comfort since the consumer pressure of the work fluid arising at the multi-plate clutch changes only slightly as a result of the change in the pilot pressure. The region marked II is characterised by a clearly greater increase in the consumer pressure in dependence on the pilot pressure and comes into use for example it a high engine torque is provided by the engine of the vehicle with the multi-plate clutch, wherein this torque can be safely transferred through the clutch depressed with high pressure, so that it is possible to reach very quickly the maximum pressure required for this purpose for biasing the multi-plate clutch as a result of the rapid change of the consumer pressure in dependence on the pilot pressure.

Figure 2:
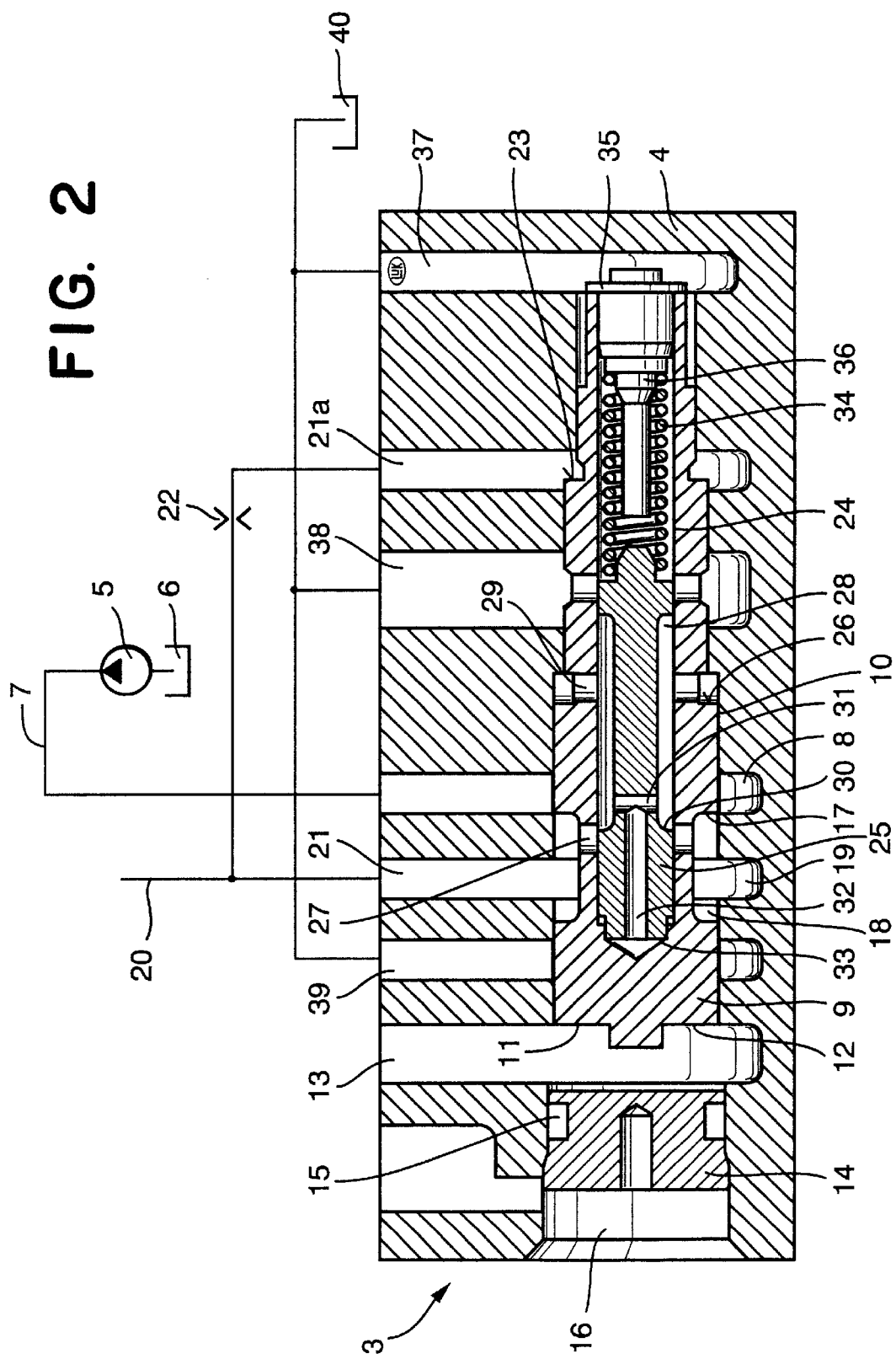
FIG. 2 is a sectional view of a hydraulic valve according to a first embodiment.

FIG. 2 of the drawing shows a sectional view of a hydraulic valve 3 according to a first embodiment. The valve 3 has very generally a valve housing marked by the reference numeral 4 with several chambers which will he explained in further detail below.

The valve 3 is supplied through a pressurised medium displacement machine, such as for example a pump 5, with a pressurised fluid from a sump 6 through a supply pipe 7 which is shown only diagrammatically, namely into an inlet or a chamber 8. The pump 5 thus supplies the hydraulic valve 3 with a pressurized fluid which is then supplied as work fluid to a hydraulic consumer (not shown) with the pressure of the work fluid supplied to the hydraulic consumer being a function of the volume or mass flow of the work fluid supplied from the hydraulic valve 3 to the hydraulic consumer.

As can be readily seen from FIG. 2, the hydraulic valve 3 has a first valve piston 9 which is housed axially displaceable in an oblong bore hole 10 of the housing 4. The valve piston 9 has on its end face 11 a control surface 12 which can be loaded by a control pressure fluid or a precontrol fluid.

The control pressure fluid supplied to the valve 3 with a variable pilot pressure $P_{pilot}$ can be supplied to the valve 3 for example through an independent pump or however can also come from the pump 5 through its own regulating circuit and is supplied to the valve 3 through a pilot chamber 13. The control fluid supplied under pressure biases the control surface 12 of the piston in the pilot chamber 13 so that at the control surface 12 a force component is produced which biases the valve piston 9 to the right in the plane of the drawing. Opposite the control surface 12 in the oblong bore hole 10 is a closure stopper 14 which closes an opening 16 for introducing the valve piston 9 into the oblong bore hole 10 and for this purpose is provided with a circumferential ring seal 15.

An axial displacement of the valve piston 9 caused by applying pressure to the control surface 12 results in the control edge 17 in the region of the waist or restriction 18 of the valve piston 9 releasing the path for a pressurised fluid to pass from the pump 5 into the inlet chamber 8 so that a volume of pressurized fluid corresponding to the cross-sectional area of the opening passes into the area of a chamber 19 which is connected to a fluid connection 20 (shown only diagrammatically) through which the pressurized fluid can be supplied as work fluid to the hydraulic consumer.

For this purpose the pressurized fluid passes through an area 21 into the fluid connection 20, namely under the consumer pressure $P_{consumer}$. The consumer pressure or work pressure also exists in a first pressure return chamber 21 a at a level which can be adjusted through a diaphragm 22 and biases a first pressure surface 23 of the first valve piston 9. The active surface are $A_{F1}$ of the first pressure return 23 is thereby smaller than the surface area $A_{ST}$ of the control surface 12 which is loaded with pressure by the control fluid.

Loading the first pressure return surface 23 with the consumer or work pressure leads to a force component which counteracts the force component which is produced by the control pressure fluid at the valve piston 9 through biasing. This first pressure return force is however as a result of the smaller active surface area $A_{F1}$ less than the force component as a result of the loading of the larger control surface 12 with the pilot pressure $P_{pilot}$.

With the first embodiment of the hydraulic valve 3 illustrated in FIG. 2 the first valve piston 9 has on the inside an oblong bore hole 24 in which a second valve piston 25 is housed axially displaceable. This second valve piston 25 acts as a pressure reducing valve and controls the pressure biasing of a second pressure return surface 26 on the first valve piston 9.

With the release of an inlet cross-section for the pressurised fluid supplied by the pump 5 through the circumferential control edge 17 on the valve piston 9, pressurised fluid passes into the chamber 19 and through a cross bore 27 arranged in the region of the restriction 18 on the first valve piston under substantially the consumer pressure into the inner bore 24 of the first valve piston 9 and here into the region of a waist or restriction 28 of the second valve piston 25.

From here the pressurised fluid flows out into the region of a cross bore 29 formed on the first valve piston 9 and also containing the second pressure return surface 26.

When the second pressure return surface 26 is loaded with pressure a force component is thereby formed which acts in the opposite direction to the biasing of the control surface 12 of the first valve piston 9. There a force equilibrium is produced between the force component through the biasing of the control surface 12 and the oppositely acting force components through the biasing of the first and second pressure return surfaces 23, 26. The pressurised fluid in the region of the restriction 28 which is reduced in pressure by the slight pressure losses as a result of the control edge 30 of the second valve piston 25 passes through a cross bore 31 and an oblong bore hole 32 into the region of the end face 33 of the second valve piston 25 so that the end face 33 is loaded with pressure which leads to a force component which biases the second valve piston 25 to the right in the plane of the drawing in the oblong bore hole 24. At its end face opposite the end face 33 the second valve piston 25 is biased by a spring 34 which is supported against an end stopper 35 having a centring face 36 for the spring 34.

So long as the force component arising through the pressure biasing of the end face 33 is smaller than the pretensioning force of the spring 34 the second valve piston 25 executes no movement in the oblong bore hole 24. If however there is an increase in the pressure applied to the end face 33 as a result of further axial displacement of the first valve piston 9 through an increasing load of pilot pressure on the end face 12 of the first valve piston 9 and a correspondingly adjusted increase in the inlet cross-section at the control edge 17, whereupon the work or consumer pressure $P_{consumer}$ rises, then the biasing of the second valve piston 25 leads to a displacement of the valve piston 25 to the right in the plane of the drawing, so that the cross bore 27 of the first valve piston 9 is increasingly closed through the control edge 30 of the second valve piston 25 so that after the cross bore 27 is closed a further increase in pressure at the second pressure return surface 26 is no longer provided which leads to a stationary state regarding the biasing of the second pressure return surface 26 of the first valve piston 9.

A further increase in the pilot pressure and the force component resulting therefrom through the biasing of the control face 12 of the first valve piston 9 therefore leads after the cross bore 27 is closed to a substantially sudden increase in the inlet cross-section at the control edge 17 of the first valve piston 9. The pilot pressure $P_{pilot}$ at which the cross bore 27 is closed through the axial displacement of the second valve piston 25 is termed $P_{kink}$, from which then the operating region II explained with reference to FIG. 1 is set at which a further increase in the pilot pressure leads to a sharper increase in the consumer pressure $P_{consumer}$ so that a maximum consumer pressure can be rapidly reached through an only slight change in the pilot pressure.

If the pilot pressure loading the control surface 12 is reduced, the force component acting at the first pressure return surface 23 leads to a resetting of the first valve piston 9 and the force component produced by the spring 34 leads to a resetting of the second valve piston 25. Pressurised fluid can be diverted from the hydraulic valve 3 through overflow chambers 37, 38 and 39 into a sump 40. The overflow chambers thereby take up any leakage which may occur between the outside faces of the piston 9, 25 and the oblong bore holes 10, 24.

Figure 3:
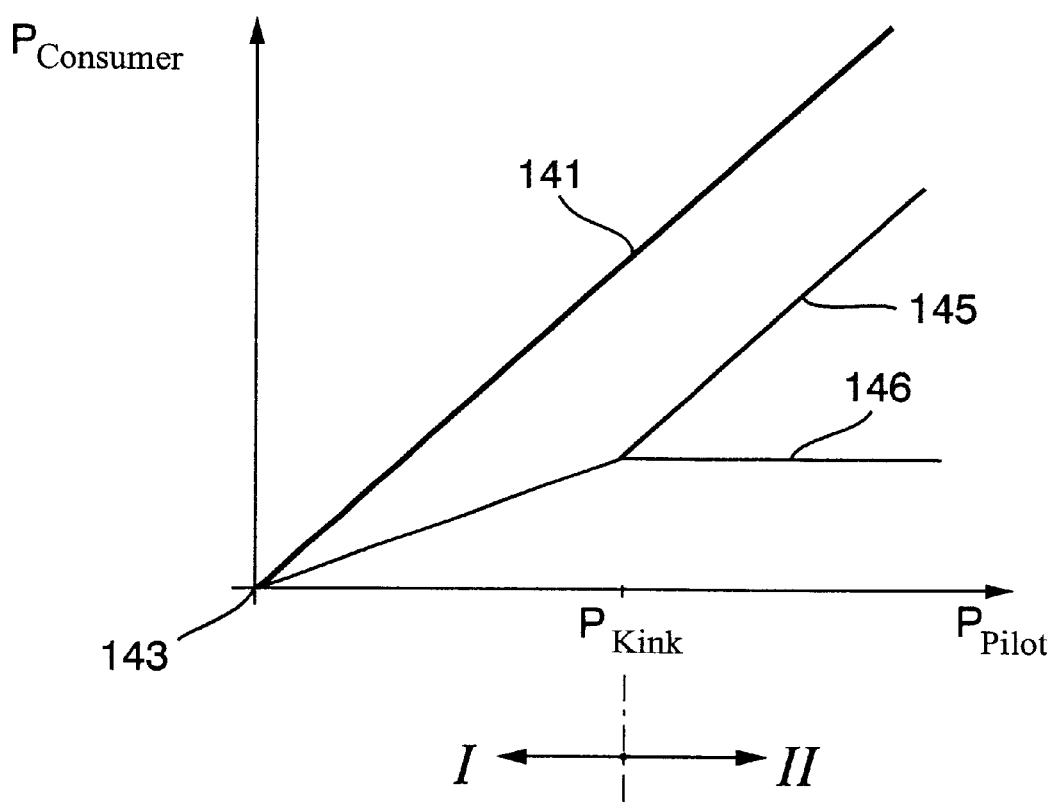
FIG. 3 shows a diagram of the consumer pressure entered over the pilot pressure of the hydraulic valve according to FIG. 2.

FIG. 3 of the drawing shows a diagram of the consumer pressure $P_{consumer}$ entered over the pilot pressure $P_{pilot}$ for the hydraulic valve 3 according to FIG. 2.

A rise in the pilot pressure $P_{pilot}$ leads to a linear rise in the precontrol force as shown by the curve 141 of the precontrol force entered for explanation. In the region marked I an increase in the pilot pressure leads to an increase in the consumer pressure with only a slight rise, as shown by the curve 142 according to FIG. 3, which from the origin 143 up to the kink pressure $P_{kink}$ at the point 144 has a clearly lower rise than the curve 145 in the region II. The curve 145 also represents the pressure return force of the first pressure return surface 23 which is loaded constantly with a pressure derived from the work pressure of the fluid. The curve 146 in FIG. 3 finally shows a stationary behavior from the kink pressure $P_{kink}$ in region II, with this curve representing the pressure return force which arises at the second pressure surface 26. As can be easily seen from the curve 146, the second pressure return surface from the kink pressure produces a force component which no longer changes and which counteracts the biasing of the control face 12 of the first valve piston 9.

Therefore in the first region I a change in the pilot pressure $P_{pilot}$ only leads to a slight change in the consumer pressure $P_{consumer}$ whilst in region II a corresponding change in the pilot pressure leads to a clearly greater change in the consumer pressure. This makes it clear that with the hydraulic valve 3 according to the first embodiment the desired characteristic of the characteristic curve of the consumer pressure entered over the pilot pressure can be achieved, namely to enable in a first region a fine sensitive control of the consumer pressure in dependence on the pilot pressure, whilst from a certain pilot pressure, namely $P_{kink}$ a change in the pilot pressure leads to a clearly greater change in the consumer pressure, whereby the consumer pressure in the second region II can be changed very rapidly by a change in the pilot pressure and thus a maximum consumer pressure can be quickly set which is required for each load case of the hydraulic consumer.

Figure 4:
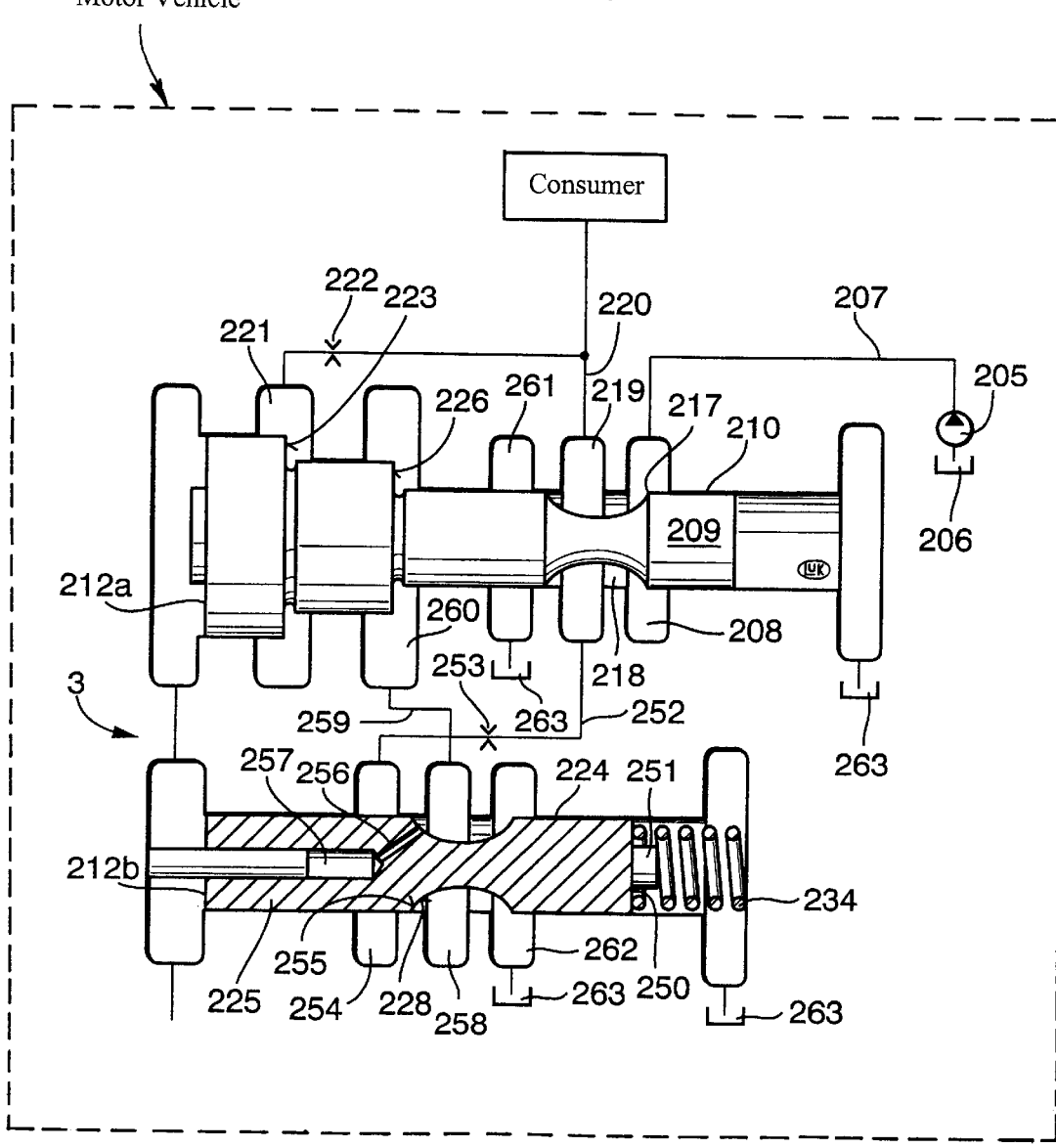
FIG. 4 is a diagrammatic view of a hydraulic valve according to a second embodiment.

FIG. 4 of the drawings which shows diagrammatically a hydraulic valve 3 according to a second embodiment will now be discussed in further detail.

With this second embodiment the first valve piston 209 acts as a pressure regulating valve and the second valve piston 225 also acts as a pressure regulating valve Both valve pistons 209, 225 have a control surface 212a, 212b which are loaded with a pilot pressure by a control fluid. In the same way as with the first embodiment already described above the biasing of the control surfaces leads to an axial displacement of the valve pistons 209 and 225 in their relevant oblong bore holes whereby in the case of the second embodiment the second valve piston 225 which controls the biasing of the second pressure return surface is also biased with a control pressure fluid which is not derived at the same time from the work pressure fluid intended for the hydraulic consumer.

The first valve piston 209 can be moved axially displaceable in a first oblong bore hole 210 whilst the second valve piston 225 can move axially displaceable in a second oblong bore hole 224, namely against the pretensioning force of a compression spring 234 which is supported on the end face 250 of the second valve piston 225 on the right in the plane of the drawing guided by a centring attachment 251 (illustrated) against an end side of the oblong bore hole 224 in a housing (not shown in further detail) of the hydraulic valve.

Pressurised fluid is also supplied to the hydraulic valve according to the second embodiment through a pump 205 from a sump 206 via an inlet supply pipe 207, namely into the area of an inlet supply chamber 208 which can be opened and closed through a control edge 217 on the first valve piston 209. Biasing the end face 212a of the first valve piston 209 with pressure leads to a displacement of the first valve piston 209 in the first oblong bore hole 210 to the right in the plane of the drawing so that the control edge 217 releases the inlet opening from the inlet chamber 208 into the area of the restriction 218 on the first valve piston 209. The pressurized fluid supplied from the pump 205 passes over this restriction 218 into the area of a chamber 219 from which it can be supplied to a hydraulic consumer (not shown in further detail) through a fluid connection 220.

The work pressure arising in the chamber 219 is supplied through a further fluid connection and diaphragm 222 to a pressure return chamber 221 in which the first pressure return face 223 of the first valve piston 209 is arranged so that the force component arising at the pressure return surface 223 through the pressure biasing counteracts the biasing of the first valve piston 209 through the end face 212a.

The pressure arising in the chamber 219 is also passed onto an inlet chamber 254 of the second valve piston 225 through a fluid connection 252 and diaphragm 253. Biasing the end face 212b of the second valve piston 225 with pressure leads to an axial displacement of the second valve piston so that a control edge 255 of the second valve piston 225 formed in the area of the restriction 228 enables an inlet cross-section to be produced for conveying the pressure from the inlet chamber 254 into the region of the restriction 228.

The pressure thus arising in the region of the restriction 228 acts through a cross bore 256 on an internal slider 257. The pressurised fluid in the region of the restriction 228 passes through a chamber 258 in the region of the restriction 228 and a fluid connection 259 into a second pressure return chamber 260 at the first valve piston 209 and there biases a second pressure return surface 226 on the first valve piston 209. The first valve piston 209 has an overflow chamber 261 through which pressurized fluid can be relaxed into a sump 263. In a similar way the second valve piston 225 has an overflow chamber 262 through which pressurised fluid can be relaxed into a sump 263.

The method of functioning of the hydraulic valve according to the second embodiment is now as follows. The pressurised fluid supplied through the pump 205 passes into the inlet chamber 208 of the first valve piston 209 and over the control edge 217 and a restriction 218 into the chamber 219 and is supplied to the hydraulic consumer through the fluid connection 220. The first pressure return surface 223 of the first valve piston 209 is biased by a pressure adjustable through the diaphragm 222 and derived from the consumer pressure to thus produce a force component towards the left in the plane of the drawing.

The pressure in the chamber 219 spreads through the fluid connection 252 and adjusted by the diaphragm 253 into the inlet chamber 254 of the second valve piston 225 and there biases the chamber 258 through the control edge 255. The pressure arising in the chamber 258 spreads through the fluid connection 259 and the second pressure return chamber 260 and there biases the second pressure return surface 226 which likewise produces a force component directed to the left in the plane of the drawing.

The force component produced by the second pressure return face 226 can be smaller than that of the force component produced by the first pressure return face 223 since the biased active surface of the second pressure return surface 226 is smaller than the biased active surface of the first pressure return surface 223. In another embodiment this can also not be case without restricting the generalities.

The arrangement formed with the second valve piston 225 is located in the normally open state through spring tensioning by the spring 234 so that a fluid connection stands open from the pump 205 through the route described above into the second pressure return chamber 260. A pilot pressure is now supplied to the hydraulic valve 3, that is the two control faces 212a and 212b are each laded with a pressurised force acting to the right. This loading leads in the first valve piston 209 to an enlarged opening of the inlet cross-section which is formed at the control edge 217. A pressure rise thus set in the region of the restriction 218 continues through the chamber 219, the fluid connection 252, the diaphragm 253, the chamber 254, the control edge 255, the chamber 258 and the fluid connection 259 up into the pressure return chamber 260 where it biases here the second pressure return surface 226. At the same time the biasing of the control face 212b of the second valve piston ensures a force component acting against the pretensioning force of the spring 234 so that the piston 225 is moved to the right and the control edge 255 can reduce the inlet cross-section formed at this spot. A rise in the pilot pressure therefore leads to an increasing consumer pressure and as a result of the reduction in the inlet cross-section at the control edge 255 to a drop in the pressure supply at the second pressure return chamber 260 and thus to a reduction in the pressure biasing of the second pressure return face 226. AS opposed to the embodiment according to FIG. 2 the force component produced by the second pressure return surface 226 therefore does not remain constant from a certain pilot pressure but decreases with a rising pilot pressure.

Figure 5:
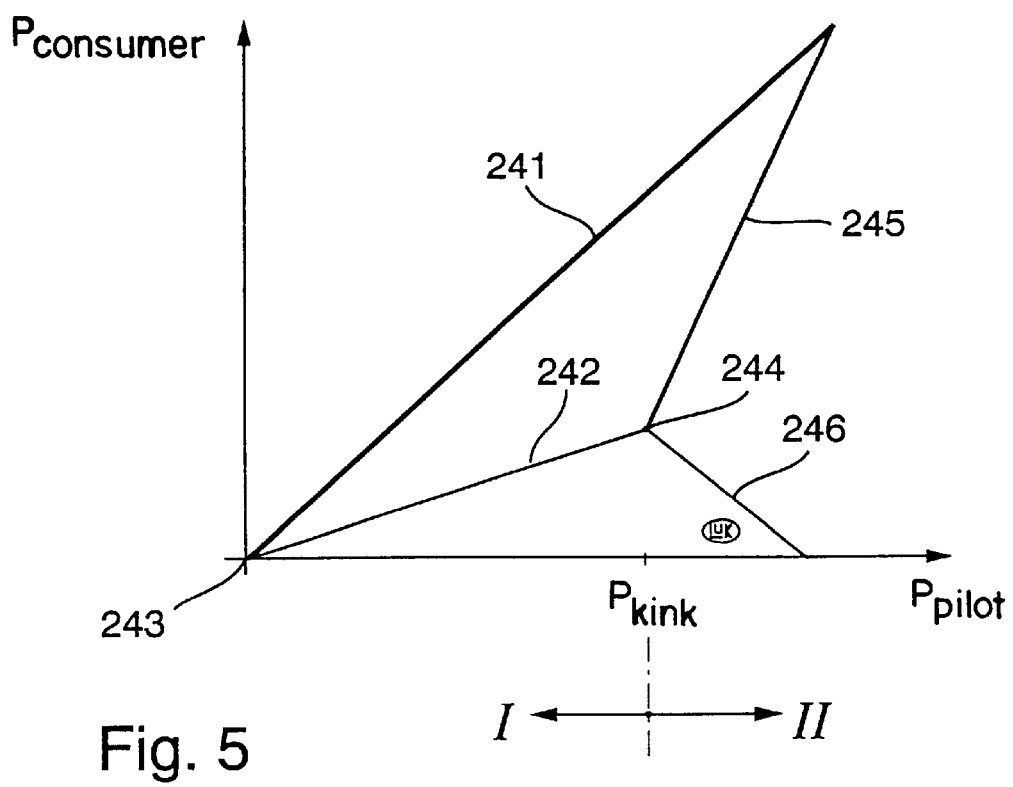
FIG. 5 is a diagram of the consumer pressure entered over the pilot pressure for the hydraulic valve according to the second embodiment.

The conditions thus described will become clearer when considering FIG. 5 which shows the consumer pressure entered over the pilot pressure of the second embodiment.

The pilot pressure 241 rises with a rising pilot pressure $P_{pilot}$. In a way similar to the illustration according to FIG. 3, the consumer pressure rises in the region marked I until reaching the kink pressure 244 ($P_{kink}$). A further increase in the pilot pressure leads to a drop in the force component produced at the second pressure return face 226, as is readily apparent from the curve 246. This means that as opposed to the first embodiment, a constant pressure return force formed at the second pressure return surface no longer arises through the second pressure return surface but this pressure return force drops with a rising pilot pressure. This drop in the force component at the second pressure return face 226 leads therefore as a result of the force equilibrium between the biased active faces, thus the end face 212a of the first pressure return surface 223 and the second pressure return surface 226, to the force component produced by the first pressure return surface 223 rising significantly more sharply than the force component which is produced by the first pressure return surface 23 according to the first embodiment. This connection is also apparent in FIG. 5 from the clearly higher rise of the curve 245 so that from the kink pressure $P_{kink}$ in the region II there is a clearly greater rise in the consumer pressure, and thus a change in the pilot pressure $P_{pilot}$ in the region II according to the second embodiment leads to a greater change in the consumer pressure.

The hydraulic valve according to the invention avoids the problem of a permanent leak in the case of cone seat valves during operation on exceeding the kink point. The problem of unstable characteristic lines as a result of the complex flow conditions in the case of pressure restricting valves has also been removed. The use of valve pistons reduces the leakage problem since only a slight leak occurs at the sealing gaps of the pistons and compared with seat valves no permanent through-flow.

Although the invention has been explained with reference to two embodiments it is not restricted to same. By way of example it is possible to provide a route valve instead of the second pressure regulating valve formed by the second valve piston 225 according to the second embodiment.

For features of the invention mentioned above but not described in further detail reference is made in particular to the claims and drawings.

A hydraulic valve with a kinked characteristic curve is provided for a hydraulic consumer of a motor vehicle, having a first and second valve body which are each mounted axially displaceable in a bore and each have at least one control surface which can be biased by a control pressure fluid, wherein two pressure return faces are provided on one valve body which can be biased controllable by a pressure fluid and which counteract the pressure biasing of the control surface whilst the other valve body controls the biasing of at least one of the pressure return faces.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Hydraulic valve having a kinked characteristic curve for a hydraulic consumer of a motor vehicle, with a first and a second valve body which are each arranged axially displaceable in one bore and each have at least one control surface which can be biased by a control pressure fluid, characterized in that two pressure return faces are provided on the second valve body and can be biased in controlled manner by a pressurized fluid to counteract the pressure biasing of the control surface whilst the first valve body controls the biasing of at least one of the pressure return faces; the first valve body being arranged in a bore that is provided in the second valve body and the hydraulic valve is formed of two sub-units, the first sub-unit with the first valve body being one of a pressure-reducing valve and a pressure-regulating valve, and the second sub-unit with the second valve body being a pressure-regulating valve.

2. Hydraulic valve more particularly according to claim 1 characterised in that the valve bodies are formed as valve pistons.

3. Hydraulic valve more particularly according to claim 2 characterised in that the two pressure return surfaces are of different size.

4. Hydraulic valve more particularly according to one of claims 1 to 3 characterised in that at least one of the pressure return surfaces is biased by a pressurised fluid with variable pressure level.

5. Hydraulic valve more particularly according to claim 4 characterised in that the other pressure return surface is biased from the kink point of the valve characteristic curve with a pressurised fluid of substantially unchanged pressure level.

6. Hydraulic valve more particularly according to claim 4 characterized in that the other pressure return surface is biased from the kink point of the valve characteristic curve with a pressurised fluid with decreasing pressure level.

7. Hydraulic valve more particularly according to claim 1 characterised in that the pressure return surfaces are biased by a work fluid which is supplied to the hydraulic consumer.

8. Hydraulic valve more particularly according to claim 1 characterised in that the valve body with the pressure return faces acts as a pressure regulating valve.

9. Hydraulic valve more particularly according to claim 1 characterised in that the control pressure fluid is a precontrol pressurised fluid.

10. Hydraulic valve more particularly according to claim 1, characterised in that the control pressure fluid of the valve body controlling the biasing of the pressure return surfaces is the work fluid supplied to the hydraulic consumer.

11. Motor vehicle having a hydraulic pressurised medium unit including a hydraulic consumer and at least one pressurised medium pump and at least one hydraulic valve for supplying the hydraulic consumer with pressurised fluid as work fluid, wherein the pressure of the work fluid is substantially proportional to the control pressure and from a predetermined control pressure ($P_{kink}$) the proportional ratio is increased compared to the region below the predetermined control pressure, and wherein the hydraulic valve includes a first and a second valve body which are each arranged axially displaceable in one bore and each have at least one control surface which can be biased by a control pressure fluid, characterized in that two pressure return faces are provided on the second valve body and can be biased in controlled manner by a pressurized fluid to counteract the pressure biasing of the control surface whilst the first valve body controls the biasing of at least one of the pressure return faces; the first valve body being arranged in a bore that is provided in the second valve body and the hydraulic valve is formed of two sub-units, the first sub-unit with the first valve body being one of a pressure-reducing valve and a pressure-regulating valve, and the second sub-unit with the second valve body being a pressure-regulating valve.

12. Motor vehicle more particularly according to claim 11 characterised in that the hydraulic valve is operated such that the proportional ratio changes substantially suddenly.

13. Motor vehicle more particularly according to claim 11 characterised in that the hydraulic valve is operated such that the proportional ratio changes substantially continuously.

* * * * *

UNITED STATES PATENT AND TRADEMARK OFFICE
CERTIFICATE OF CORRECTION

PATENT NO.    : 6,412,392 B1
DATED         : July 2, 2002
INVENTOR(S)   : Ebinger Gunter et al.

It is certified that error appears in the above-identified patent and that said Letters Patent is hereby corrected as shown below:

<u>Title page,</u>
Item [73], Assignee, in the Assignee's residence, delete "Behl/Baden" and substitute
-- Buhl/Baden --

Signed and Sealed this

Twenty-second Day of April, 2003

JAMES E. ROGAN
*Director of the United States Patent and Trademark Office*